United States Patent
Rude et al.

(10) Patent No.: US 10,194,583 B2
(45) Date of Patent: Feb. 5, 2019

(54) HITCH SWING CYLINDER MOUNTING POINT REPOSITIONING MECHANISM

(71) Applicants: Derek S. Rude, Muenster (CA); Murray Kosokowsky, Pilger (CA)

(72) Inventors: Derek S. Rude, Muenster (CA); Murray Kosokowsky, Pilger (CA)

(73) Assignee: CNH Industrial America LLC, New Holland, PA (US)

( * ) Notice: Subject to any disclaimer, the term of this patent is extended or adjusted under 35 U.S.C. 154(b) by 167 days.

(21) Appl. No.: 14/081,996

(22) Filed: Nov. 15, 2013

(65) Prior Publication Data
US 2015/0135673 A1    May 21, 2015

(51) Int. Cl.
| | | |
|---|---|---|
| A01D 34/00 | (2006.01) | |
| A01D 75/00 | (2006.01) | |
| A01D 34/66 | (2006.01) | |

(52) U.S. Cl.
CPC ......... *A01D 34/001* (2013.01); *A01D 34/00* (2013.01); *A01D 34/66* (2013.01); *A01D 75/00* (2013.01); *A01D 75/002* (2013.01)

(58) Field of Classification Search
CPC ..... A01B 73/005; A01B 63/32; A01B 63/245; A01D 67/005; A01D 34/001; A01D 34/00; A01D 34/66; A01D 75/00; A01D 75/002
USPC ....... 56/14.9, 15.6, 218, 228, DIG. 14, 15.5; 172/324–328
See application file for complete search history.

(56) References Cited

U.S. PATENT DOCUMENTS

| | | |
|---|---|---|
| 1,421,439 A | 7/1922 | Finckh |
| 2,109,098 A | 2/1938 | Baxter |
| 2,286,305 A | 6/1942 | Priestley |
| 2,540,228 A | 2/1951 | Adkisson |
| 2,833,105 A | 5/1958 | Naery |
| 2,911,780 A | 11/1959 | Brady |
| 2,938,588 A | 5/1960 | Stein |
| 3,241,300 A | 3/1966 | Fell et al. |
| 3,245,695 A | 4/1966 | Bernard |
| 3,288,480 A | 11/1966 | Calkins et al. |

(Continued)

FOREIGN PATENT DOCUMENTS

| | | |
|---|---|---|
| DE | 4309498 A1 | 9/1994 |
| DE | 20113820 | 12/2001 |

(Continued)

OTHER PUBLICATIONS

U.S. Appl. No. 15/099,827, entitled "Pull-Type Disk Mowing Machine Transport System," MacDon Industries Ltd. & Maschinenfabrik Bernard Krone GmbH Applicants, 45 pp.

(Continued)

*Primary Examiner* — Thomas B Will
*Assistant Examiner* — Mai T Nguyen
(74) *Attorney, Agent, or Firm* — Peter K. Zacharias; Patrick M. Sheldrake

(57) ABSTRACT

A hitch swing cylinder mounting point repositioning mechanism for use on an agricultural mower that enables the draft tongue to be pivoted through a swing range during mower operation when the mounting point is in a first position. Repositioning the mounting point to a second position enables the swing cylinder to pivot the draft tongue to a position generally perpendicular to the normal operating direction of travel thereby enabling lateral transport of the mower.

19 Claims, 3 Drawing Sheets

(56) References Cited

U.S. PATENT DOCUMENTS

| | | |
|---|---|---|
| 3,408,956 A | 11/1968 | Rebenok et al. |
| 3,515,408 A | 6/1970 | Cagle |
| 3,523,410 A | 8/1970 | Taylor et al. |
| 3,577,713 A | 5/1971 | McCarty et al. |
| 3,590,928 A | 7/1971 | Mirus |
| 3,648,780 A | 3/1972 | Fueslein et al. |
| 3,683,602 A | 8/1972 | Scarnato et al. |
| 3,721,073 A | 3/1973 | Scarnato et al. |
| 3,786,764 A | 1/1974 | Beers, Jr. et al. |
| 3,814,191 A | 6/1974 | Tilbury |
| 3,841,070 A | 10/1974 | Scarnato et al. |
| 3,881,301 A | 5/1975 | Sawyer et al. |
| 3,897,832 A | 8/1975 | Leedahl et al. |
| 3,911,649 A | 10/1975 | Scarnato et al. |
| 3,919,831 A * | 11/1975 | Halls et al. .............. 56/228 |
| 3,955,627 A | 5/1976 | Brown |
| 4,026,365 A | 5/1977 | Andersson et al. |
| 4,043,403 A | 8/1977 | Anderson et al. |
| 4,099,364 A | 7/1978 | Kanengieter et al. |
| 4,106,788 A | 8/1978 | Bohnert |
| 4,106,813 A | 8/1978 | Goodbary |
| 4,119,329 A | 10/1978 | Smith |
| 4,162,085 A | 7/1979 | Miranowski |
| 4,180,135 A | 12/1979 | Birkenbach et al. |
| 4,222,334 A | 9/1980 | Peterson |
| 4,283,071 A | 8/1981 | Pedersen |
| 4,316,511 A | 2/1982 | Andersen |
| 4,361,341 A | 11/1982 | Gustafson |
| 4,418,516 A | 12/1983 | Donovan et al. |
| 4,418,517 A | 12/1983 | Ehrhart et al. |
| 4,418,518 A | 12/1983 | Koch et al. |
| 4,435,948 A | 3/1984 | Jennings |
| 4,442,662 A | 4/1984 | Jennings |
| 4,455,034 A | 6/1984 | de Graff et al. |
| 4,460,193 A | 7/1984 | Dietz et al. |
| 4,506,904 A | 3/1985 | Kinzenbaw |
| 4,512,416 A | 4/1985 | Smith |
| 4,526,235 A | 7/1985 | Kinzenbaw |
| 4,534,416 A | 8/1985 | Johnson |
| 4,552,375 A * | 11/1985 | Kinzenbaw .......... A01B 73/005 172/248 |
| 4,558,560 A | 12/1985 | Koch |
| 4,573,309 A | 3/1986 | Patterson |
| 4,607,996 A * | 8/1986 | Koch ........................ 414/537 |
| 4,660,654 A | 4/1987 | Wiebe et al. |
| 4,662,646 A | 5/1987 | Schlapman et al. |
| 4,682,462 A | 7/1987 | Johnson, Sr. |
| 4,765,639 A | 8/1988 | Murray |
| 4,831,814 A | 5/1989 | Frisk et al. |
| 4,867,245 A | 9/1989 | Stevens |
| 4,871,028 A | 10/1989 | Murray |
| 4,905,466 A | 3/1990 | Heppner |
| 4,934,131 A | 6/1990 | Frisk et al. |
| 4,986,064 A | 1/1991 | Ermacora |
| 4,991,383 A | 2/1991 | Ermarcora |
| 5,000,268 A | 3/1991 | Zimmerman |
| 5,024,279 A | 6/1991 | Warner et al. |
| 5,025,616 A | 6/1991 | Moss |
| 5,113,956 A | 5/1992 | Friesen et al. |
| 5,136,828 A | 8/1992 | Ermacora |
| 5,199,250 A | 4/1993 | Ermacora |
| 5,243,810 A | 9/1993 | Fox et al. |
| 5,274,990 A | 1/1994 | Aron et al. |
| 5,429,195 A | 7/1995 | Turnis |
| 5,566,536 A | 10/1996 | Krafka et al. |
| 5,642,607 A * | 7/1997 | Stephenson et al. .......... 56/15.1 |
| 5,778,647 A | 7/1998 | McLean et al. |
| 5,839,516 A | 11/1998 | Arnold et al. |
| 5,901,533 A * | 5/1999 | Ermacora et al. .............. 56/6 |
| 5,930,988 A | 8/1999 | Hanson |
| 5,943,848 A | 8/1999 | Rice et al. |
| 6,152,240 A | 11/2000 | Nonhoff et al. |
| 6,189,306 B1 | 2/2001 | Walch |
| 6,209,297 B1 | 4/2001 | Yeomans et al. |
| 6,213,219 B1 | 4/2001 | Mosdal et al. |
| 6,238,170 B1 | 5/2001 | Pingry et al. |
| 6,260,629 B1 * | 7/2001 | Toth ........................ 172/282 |
| 6,273,449 B1 | 8/2001 | Harkcom et al. |
| 6,321,852 B1 | 11/2001 | Pratt |
| 6,336,313 B1 | 1/2002 | Bonnewitz |
| 6,360,516 B1 * | 3/2002 | Harkcom et al. .............. 56/15.5 |
| 6,408,950 B1 | 6/2002 | Shoup |
| 6,421,994 B1 | 7/2002 | Boucher et al. |
| 6,485,246 B1 | 11/2002 | Harkcom et al. |
| 6,546,708 B2 | 4/2003 | Faivre |
| 6,606,956 B1 | 8/2003 | Paluch |
| 6,702,035 B1 | 3/2004 | Friesen |
| 6,739,612 B2 | 5/2004 | Colistro |
| 6,854,251 B2 | 2/2005 | Snider |
| 6,907,719 B2 | 6/2005 | Ligouy |
| 7,047,714 B1 | 5/2006 | Stephenson et al. |
| 7,100,350 B2 | 9/2006 | Breneur |
| 7,197,865 B1 | 4/2007 | Enns et al. |
| 7,347,277 B2 | 3/2008 | Enns et al. |
| 7,552,579 B2 | 6/2009 | Tippery et al. |
| 7,712,544 B1 | 5/2010 | Misenhelder et al. |
| 7,849,933 B2 | 12/2010 | Marggi |
| 7,926,249 B1 | 4/2011 | Cook |
| 8,112,977 B2 | 2/2012 | Priepke |
| 8,141,652 B2 | 3/2012 | Poole et al. |
| 8,209,946 B2 | 7/2012 | Neudorf et al. |
| 8,292,328 B2 | 10/2012 | Honas et al. |
| 8,464,508 B2 | 6/2013 | Matousek et al. |
| 9,179,591 B2 | 11/2015 | Barnett et al. |
| 9,179,592 B2 | 11/2015 | Snider et al. |
| 9,185,837 B2 | 11/2015 | Barnett et al. |
| 9,185,838 B2 | 11/2015 | Chan et al. |
| 9,185,839 B2 | 11/2015 | Kolegaev et al. |
| 2002/0005629 A1 | 1/2002 | Rosenboom |
| 2004/0011538 A1 | 1/2004 | Raducha et al. |
| 2006/0123764 A1 | 6/2006 | McLean et al. |
| 2011/0197561 A1 | 8/2011 | Priepke |
| 2011/0272917 A1 | 11/2011 | Hilsabeck et al. |
| 2012/0132768 A1 | 5/2012 | Lammerant et al. |
| 2013/0284467 A1 | 10/2013 | Snider et al. |
| 2013/0284468 A1 | 10/2013 | Barnett et al. |
| 2013/0284469 A1 | 10/2013 | Barnett et al. |
| 2014/0053522 A1 | 2/2014 | Kolegaev et al. |
| 2014/0083071 A1 | 3/2014 | Fay, II |
| 2014/0096498 A1 | 4/2014 | Estock et al. |
| 2014/0196429 A1 | 7/2014 | Gantzer |
| 2015/0282426 A1 | 10/2015 | Gantzer et al. |
| 2016/0007534 A1 | 1/2016 | Fay, II |

FOREIGN PATENT DOCUMENTS

| | | |
|---|---|---|
| EP | 350513 | 1/1990 |
| EP | 764396 | 3/1997 |
| EP | 628237 B1 | 8/1997 |
| EP | 818134 | 1/1998 |
| EP | 823985 | 2/1998 |
| EP | 1769668 | 4/2007 |
| FR | 2332690 | 6/1977 |
| FR | 2712137 | 5/1995 |
| FR | 2752356 | 2/1998 |
| GB | 2194872 A | 3/1988 |
| GB | 2232055 | 12/1990 |
| GB | 2490342 | 10/2012 |
| GB | 2504093 | 1/2014 |
| WO | WO2013135676 | 9/2013 |

OTHER PUBLICATIONS

U.S. Appl. No. 15/099,827, entitled "Pull-Type Disk Mowing Machine Transport System," MacDon Industries Ltd. & Maschinenfabrik Bernard Krone GmbH Applicants, 16 pp.

* cited by examiner

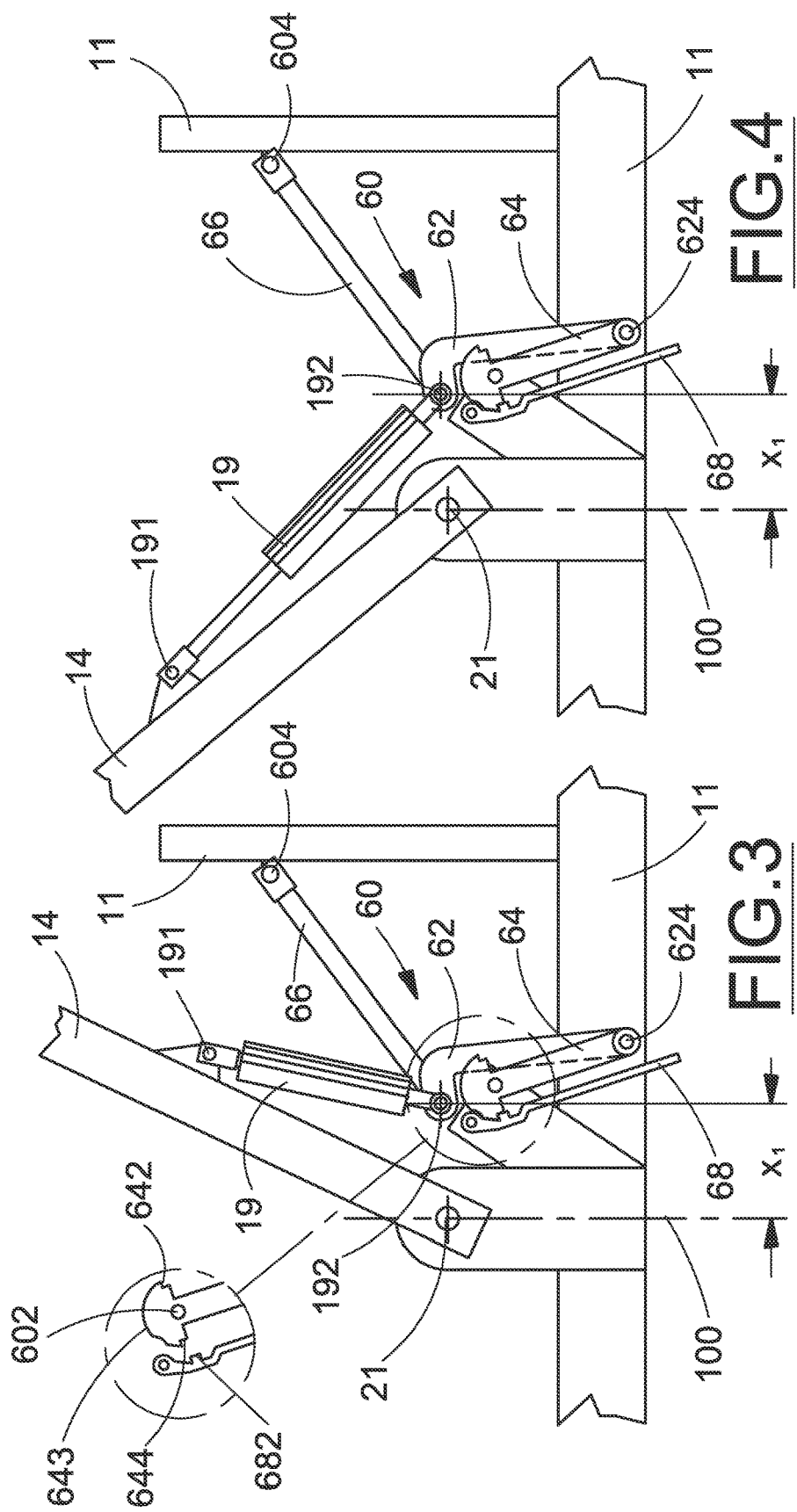

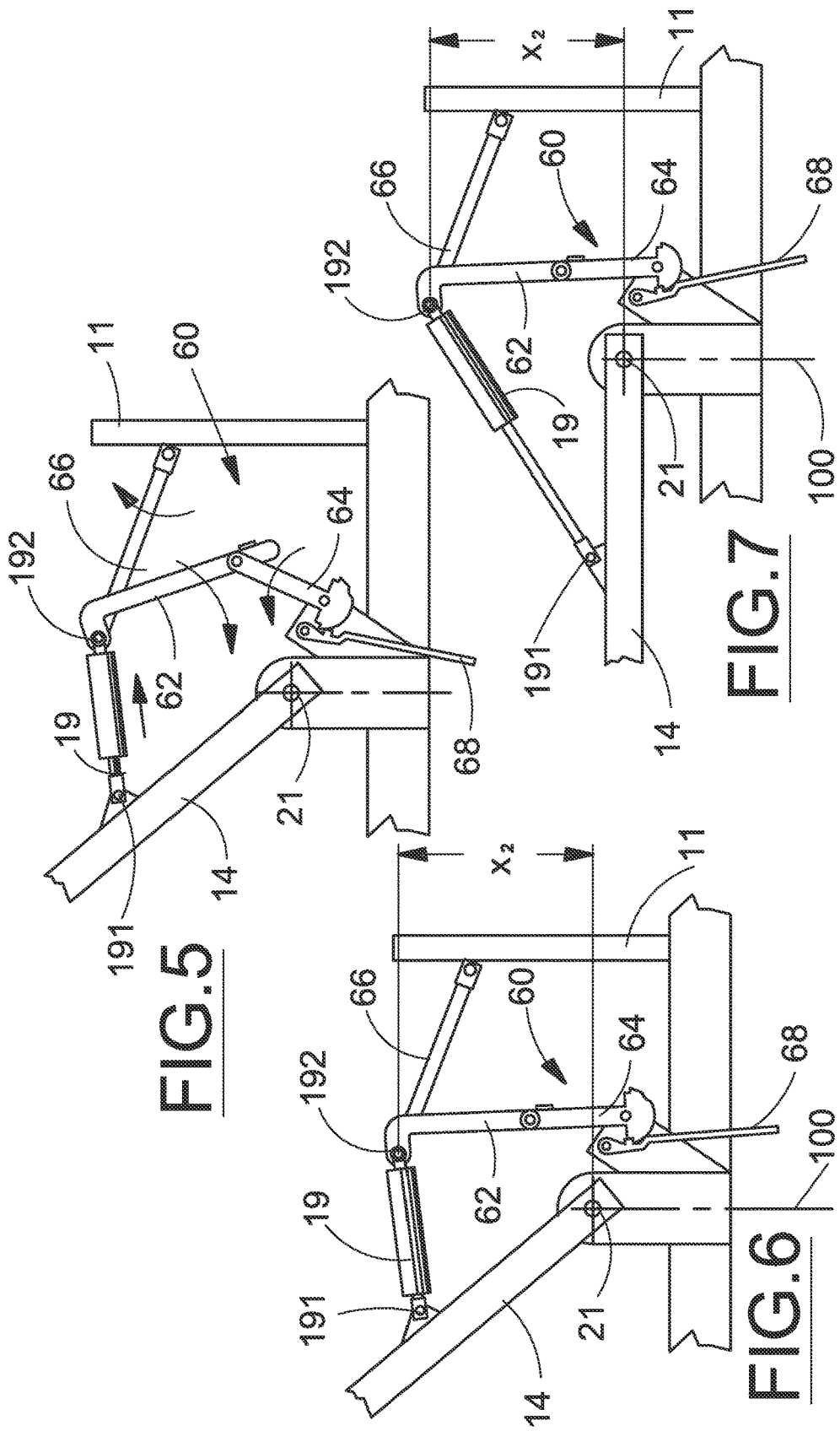

HITCH SWING CYLINDER MOUNTING POINT REPOSITIONING MECHANISM

CROSS REFERENCE TO RELATED APPLICATIONS

This application claims the benefit of priority to U.S. Patent Application entitled "Integral Lateral Transport of a Mower", Ser. No. 14/024,256, filed on Sep. 11, 2013.

This application is related to U.S. Patent Application entitled "Integral Lateral Transport of a Mower", Ser. No. 14/024,256, filed on Sep. 11, 2013; and U.S. Patent Application entitled "Right Side (Front) Lateral Transport Wheel", Ser. No. 14/050,420, filed on Oct. 10, 2013. These related applications are herein incorporated by reference.

BACKGROUND OF THE INVENTION

The present invention relates generally to agricultural harvesting machines, and more particularly relates to a mechanism for repositioning the machine as it is trailed behind a prime mover to enable the machine to be transported in less than its normal operating width.

Agricultural mowers are well known and include self-propelled and pull-behind types. One common problem with pull-behind mowers involves transporting the machines between fields as the width of the machine may be 15 feet or more. Machine movement may be necessary over farm lanes, through gates or even some highways where the machine width will not allow passage in the operating orientation. One solution is to reconfigure the mower for transport by re-orienting the mower 90 degrees from its normal operational orientation and towing the mower along its operational lateral axis. This approach generally involves the addition of mechanisms to reorient the wheel axles of the wheels that support the unit in a mowing configuration, hereinafter referred to as "mowing wheels," 90 degrees for lateral transport or add transport wheels that can be deployed for lateral transport. The additional transport wheels and positioning mechanisms are typically complex and often encumber normal operation of the mower.

It would be advantageous to provide an agricultural mower that could be conveniently re-oriented for over-the-road transport towing in the direction of its operational lateral axis. Further advantages would be realized by a transport wheel mechanism that is stows a transport wheel able in a manner minimizing the impact on mower operation when not in use, but that enables the transport wheel to be quickly and easily deployed for stable lateral transport of the mower. Still further advantages would be realized by a lateral transport system that can be produced with less cost that the separate trailer lateral transport option it replaces.

SUMMARY OF THE INVENTION

Accordingly, the present invention, in any of the embodiments described herein, may provide one or more of the following advantages:

It is an object of the present invention to provide a moveable frame for supporting an agricultural mower in a generally transverse orientation to the direction of travel for mowing operation, and in a generally longitudinal orientation in line with the direction of travel for non-operational transport. The mower frame includes a pivoting tongue to allow connection to a prime mover. A pair of mowing wheels is provided adjacent to a rearward end of the mower frame aligned for travel as the mower and frame are transversely oriented. A pair of transport wheels is also provided, the transport wheels being alignable for travel generally perpendicularly to the operational travel direction, each transport wheel having a moveable support for positioning of the respective transport wheel in a deployed position or a non-deployed position.

The frame further includes a draft tongue pivotally connected to the frame for movement about an upstanding pivot axis. The draft tongue may be positioned in at least a first position for lateral towing by a prime mover of the mower for mowing operation and a second position in which the draft tongue is aligned to pull the mower in a longitudinal transport orientation trailing behind the prime mover. The mower frame may be operationally angled in relation to the draft tongue to allow the mower frame to be trailed along a path offset from the path of the prime mover. The configuration of the first and second transport wheel supports is such that the transport wheels do not interfere with pivoting movement of the draft tongue when the mower is configured for operation.

Movement of the draft tongue is by a hydraulic actuator coupled between the draft tongue and the mower frame such that extension and retraction of the actuator pivots the tongue about an upstanding axis in relation to the frame. During operation, the draft tongue is typically pivoted away from a straight-ahead orientation to as much as 45 degrees in either direction to position the mower travel path adjacent to that of the prime mover. For lateral transport, the tongue must be pivoted as much as 90 degrees from the normal straight ahead direction. The actuator connection to the frame is moveable between two positions that enable the actuator to accomplish the necessary tongue pivoting range using a single, standard actuator. The first position locates the actuator end for pivoting the draft tongue approximately +/−45 degrees from the normal straight ahead direction during mower operation. The second position locates the actuator end to enable it to pivot the draft tongue approximately 90 degrees from the normal straight ahead position to enable lateral transport of the mower. A selectively releasable latch retains the actuator end in the desired position.

The two positions for the actuator end also provide two distinct ranges of operation so that normal operation of the mower and draft tongue positioning is unaffected by the addition of the capability for expanded draft tongue pivoting capability.

Yet another object of the present invention to a moveable frame for supporting an agricultural mower that is selectively positionable in a transverse operational orientation or a lateral transport orientation that is durable in construction, inexpensive of manufacture, carefree of maintenance, easily assembled, and simple and effective to use. The moveable frame relies on well-known methods for repositioning moveable elements on agricultural equipment and enables re-positioning of the mower between transport and operational configurations with minimal machine operator effort.

These and other objects are achieved in accordance with the instant invention as described in detail herein.

BRIEF DESCRIPTION OF THE DRAWINGS

The advantages of this invention will be apparent upon consideration of the following detailed disclosure of the invention, especially when taken in conjunction with the accompanying drawings wherein:

FIGS. 3 and 4 are detail views of the swing cylinder mounting point repositioning mechanism shown in a first position as configured for normal operation of the mower;

FIG. 5 is a detail view of the mechanism of FIG. 3 shown in an intermediate position; and FIGS. 6 and 7 are detail views of the mechanism of FIG. 3 shown in a second position as would be used for mower lateral transport.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures. Alpha designations following a numeric designator are used to distinguish the two similar parts, typically right side/left side on the generally symmetrical invention; reference to the numeric designator alone indicates the either part.

Figure 1:
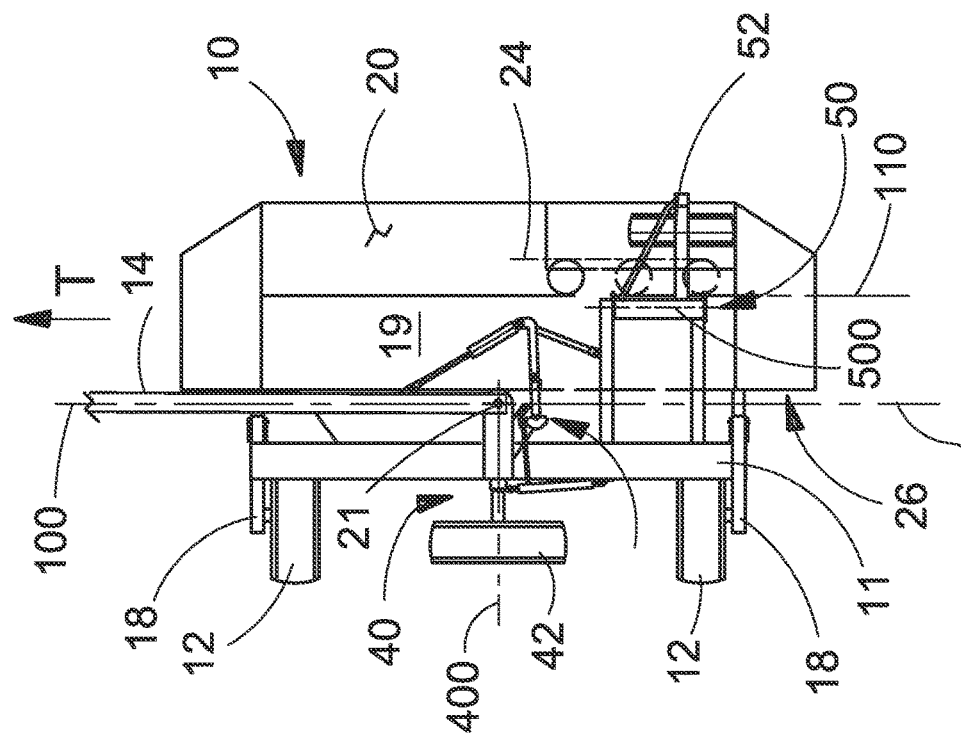
FIG. 1 is a plan view of an agricultural pull-behind harvester incorporating a first embodiment of the lateral transport system of the present invention and is shown in an operating configuration.

Referring now to the drawings and particularly to FIG. 1, an agricultural implement 10 incorporating the principles of the instant invention can best be seen. Implement 10 as presented herein is what is generally known as a pull-behind center-pivot mower and is provided with a generally conventional movable frame 11 mobilely supported for operation over the ground by a pair of transversely spaced-apart trailing main wheels 12 and a draft tongue 14 configured for connection to a tractor for forward movement (direction "T") along a normal operational travel axis 100. A mower 20 is operably connected to and supported by the frame 11. Trailing main wheels 12 are preferably connected to the frame 11 by including a pair of movable trailing arms 18 whose position is managed by wheel actuators 13 to raise and lower the main wheels relative to the frame 11 thereby enabling the vertical position relative to the ground of frame 11 to be adjusted. The wheel 12 adjustment capability allows the operating height of the mower 20 above the ground to be readily adjusted. Implement 10 is shown in an operating configuration in FIG. 1 with the mower 20 generally transversely aligned to the direction of travel along transverse axis 110.

As is common in many pull-behind mowers, the draft tongue 14 is pivotally connected to the implement frame 11 at pivot connection 21, the pivotal movement thereof rotating the frame 11 and the connected mower 20 about an upstanding implement pivot axis 200 (see FIGS. 3 and 4). This pivotal movement between the frame 11 and tongue 14 normally enables the mower 20 and travel axis 100 to be laterally offset from the tractor during operation to avoid driving the tractor through standing crop material. Pivotal movement between the frame 11 and the tongue 14 about a generally upstanding implement pivot axis (pivot connection 21) is typically accomplished by a swing actuator 19 having a fixed end 191 connected to the tongue 14 and a moveable end 192 connected to the frame 11, movement of which is selectively controlled by the tractor operator using the tractor hydraulic control system. Through manipulation of the implement pivot actuator 19, typically a hydraulic cylinder, the mower 20 can be angled relative to the draft tongue 14 to operative position outboard to the right or left of the tractor so that the implement 10 can be operated without the tractor running over the standing crop. A typical range of pivoting, referred to as an operating swing range, is shown as arc "A" in FIG. 1 and is commonly angled up to 45 degrees in either direction from the normal operational travel axis 100 as shown in FIG. 1.

Figure 2:
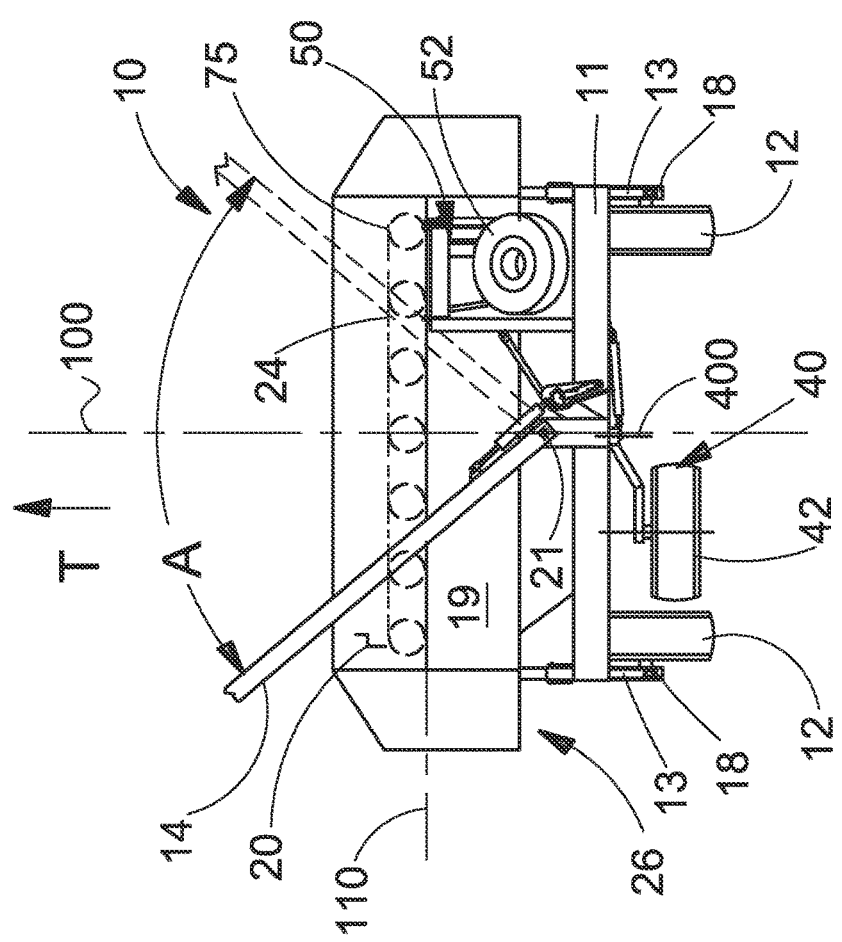
FIG. 2 is a plan view of the agricultural harvester shown in FIG. 1, wherein the harvester is shown configured for transport.

In the present invention, the swing actuator 19 is modified to increase the pivoting range of the draft tongue 14 by a mechanism 60 that enables the moveable end (192, shown in FIGS. 3 through 7) to be shifted between two spaced-apart locations. Referring now to FIG. 2, the implement 10 is shown configured for lateral transport of the mower 20 wherein the transverse axis 110 of the mower is aligned in parallel with the direction of transport travel (axis 101). A pair of moveable transport wheel supports 40, 50 each having a respective transport wheel 42, 52, allows the implement to be in a lateral transport configuration. The transport wheel supports 40, 50, are shown in a non-deployed position in FIG. 1 and in a deployed position in FIG. 2. Additionally, the draft tongue 14 is pivoted beyond the normal operational range (as shown in FIG. 1) to a transport position aligned generally perpendicularly to the operational travel direction (FIG. 1) bringing the transverse axis 110 generally parallel to the transport travel axis 100 to allow the implement to be transported in a lateral configuration, shown in FIG. 2.

Pivoting of the frame 11 and draft tongue 14 enables the frame 11 to be positioned in at least an operating position in which the transverse axis 110 is oriented transversely to the travel axis 100, and a transport position in which the transverse axis is oriented generally parallel to the travel axis 100. The operating position is shown in FIG. 1 and may include draft tongue angled orientations within the operational range "A" as illustrated, accomplished by locating the moveable end of the swing cylinder in the operating location as shown. The transport position of the draft tongue is shown in FIG. 2. Movement of the draft tongue 14 from the operating range is accomplished by repositioning the moveable end of the swing cylinder to the transport location as shown. As described herein, the travel axis 100 is laterally positioned so that it intersects the upstanding pivot axis 200, regardless of the position of the main frame.

Referring to FIGS. 3 through 7, one embodiment of a swing cylinder mounting point repositioning mechanism 60 is shown for moving an end of the swing cylinder from an operating location (FIG. 1) and a transport location (FIG. 2). The embodiment shown comprises a first link portion 62, a second link portion 64, a guide link 66, and a latch 68. First and second link portions 62, 64 are connected to each other at a pivot point 624 at one end of each link portion, respectively. The opposite end of the first link portion 62 is connected to frame 11 at first pivot 602. The opposite end of second link 64 is connected to the moveable end 192 of the actuator 19. Guide link 66 connected at a fixed end 604 to the frame 11 and to the moveable end 192 at its opposite end and is arranged to define an arced movement path for the moveable end 192. The fixed end 604 is spaced apart from first pivot to allow the arc movement of moveable end 192 as the first and second link portions unfold (see FIG. 5).

Latch 68 interacts with the second link portion 64 to retain the linkage 60 in one of two pre-determined positions. A tang 682 on the latch 68 engages one of two detents 642, 644 to restrain the second link portion 64 from rotating, thus locking the mechanism 60 in position. Latch 68 is spring biased to retain the tang 682 with the end structure of second link portion 64. A cam 643 spans between the two detents, allowing the second link portion 64 to rotate between the opposing positions. The spring biasing force forces the tang 682 into one of the respective detents 642, 644 when properly aligned and prevents the second link 64 from being rotated in the opposite direction until the latch 68 is released to disengage the tang from the detent.

When the mounting point positioning linkage 60 is in the first orientation, or operating position, shown in FIGS. 3 and 4, the mower is configured for typical mower operation wherein the draft tongue is likely to be angled no more than 45 degrees in either direction from a straight ahead orientation. In this orientation, the moveable end 192 of the swing actuator 19 is located to enable the normal operational swing movement of the draft tongue 14. This is generally proximate in the fore-aft direction to the pivot point 21 of the draft tongue and spaced laterally apart from the pivot point a distance (shown as $X_1$ in FIGS. 3 and 4) sufficient to enable the draft tongue to be pivoted the desired extent (arc A in FIG. 1) by the extension and retraction of the swing cylinder 19. In FIG. 3, the swing cylinder 19 is fully retracted while the positioning linkage 60 is in the first or normal operating position which locates the draft tongue 14 to its fullest extent to the right of the forward travel axis 100. In FIG. 4, the swing cylinder 19 is fully extended to position the draft tongue 14 to its fullest extent to the left of the forward travel axis 100 while the mounting point positioning linkage 60 is in the first position for normal mower operation.

Shifting the mounting point positioning linkage 60 to the second, or transport, position so that the mower may be reconfigured for lateral transport requires first that the draft tongue be positioned near its fullest extent to the left of the forward travel axis 100 (FIG. 4) with the swing cylinder 19 substantially extended. The mower 20 must be restrained, preferably by lowering it to the ground, so that it remains stationary relative to the prime mover to which the draft tongue is connected as the moveable end 192 is repositioned. Releasing latch 68 and retracting the swing cylinder 19 causes the moveable end 192 to be moved generally forwardly through an arc controlled by guide link 66 and unfolding the linkage if first link 62 and second link 64 (FIG. 5). The forward movement of moveable end 192 moves from the first position generally proximate in the fore-aft direction to the pivot point 21 of the draft tongue to a second position wherein the moveable end 192 is substantially forward of the pivot point 21. The latch 68 reengages to retain the positioning linkage 60 in the second position. The mower 20 may then be raised or released. Extension of the swing cylinder 19 pivots the mower relative to the draft tongue until the lateral transport position, shown in FIG. 7, is achieved. The forward extent of the second position (shown as offset $X_2$ FIGS. 6 and 7) is sufficiently forward of the first position to enable the swing actuator 19 to pivot the draft tongue 14 a position 90 degrees from the forward travel axis 100, as shown in FIG. 7.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A mechanism for positioning a draft tongue of an agricultural mower between a normal operating range and a lateral transport position, the mechanism comprising:
   an actuator that is selectively adjustable between a retracted length and an extended length, wherein the actuator is positioned between a frame of the mower and a draft tongue, the actuator having a first end connected to the draft tongue and a moveable end opposite the first end;
   a linkage associated with the actuator to allow movement of the moveable end, the linkage allowing selective movement of the moveable end between an operating position of the linkage and a transport position of the linkage, the operating position locating the moveable end so that movement of the actuator between the retracted length and the extended length causes movement of the draft tongue in an operating swing range for pulling the mower in an operational travel direction, the transport position locating the moveable end so that movement of the actuator between the retracted length and the extended length causes movement of the draft tongue beyond the operating swing range to a lateral transport position oriented generally perpendicularly to the operational travel direction, the linkage comprising first and second link portions pivotally connected to each other; and
   a latch for restraining the linkage in either the operating position or the transport position, the latch engaging the first link portion to restrain the linkage in either the operating position or the transport position,
   wherein the first end of the actuator is moveable between the retracted length and the extended length while the linkage remains in either the transport or operating position.

2. The mechanism of claim 1, wherein the first and second link portions are elongate.

3. The mechanism of claim 1, wherein the linkage further comprises an elongate guide link connected at one end to the moveable end and to the frame at a second pivot location at an opposite end.

4. The mechanism of claim 3, wherein the latch is normally positioned in a latched position to restrain the linkage in either the operating or transport positions, and wherein the latch is selectively moveable to a released position wherein the linkage is moveable between the operating position and the transport position.

5. The mechanism of claim 1, wherein the moveable end of the actuator when the linkage is in the operating position is spaced from the moveable end of the actuator when the linkage is in the transport position.

6. The mechanism of claim 1, wherein the second link portion includes a pair of detents for respectively engaging the latch in the operating position or the transport position.

7. The mechanism of claim 6, wherein the second link portion further includes a cam positioned between the detents for allowing movement of the latch to move the linkage between the operating and transport positions.

8. The mechanism of claim 1, wherein the first link and the second link are folded with respect to one another when the linkage is in the operating position.

9. An agricultural mower comprising:
a frame;
a draft tongue pivotally coupled to the frame about a generally upstanding axis;
an actuator having opposing fixed and moveable ends and a selectively adjustable length ranging between a retracted length and an extended length, the fixed end being connected to the draft tongue;
a linkage connecting the moveable end of the actuator to a first mount on the frame, the linkage allowing selective movement of the moveable end of the actuator between an operating position of the linkage and a transport position of the linkage, the operating position locating the moveable end of the actuator so that movement of the actuator between the retracted length and the extended length causes movement of the draft tongue in an operating swing range for pulling the mower in an operational travel direction, the transport position locating the moveable end of the actuator so that movement of the actuator between the retracted length and the extended length causes movement of the draft tongue beyond the operating swing range to a lateral transport position oriented generally perpendicularly to the operational travel direction, the linkage comprising first and second link portions pivotally connected to each other; and
a latch for restraining the linkage in either the operating position or the transport position, the latch engaging the first link portion to restrain the linkage in either the operating position or the transport position.

10. The agricultural mower of claim 9, wherein the first and second link portions are elongate and are pivotally connected to each other at respective first ends, respective seconds ends of the first and second link portions being pivotally connected to the moveable end and the first mount, respectively.

11. The agricultural mower of claim 10, wherein the linkage further comprises an elongate guide link connected at one end to the moveable end of the actuator and to the frame at a second mount at an opposite end, the second mount being spaced apart from the first mount, the guide link guiding the moveable end of the actuator through an arc as the actuator is adjusted between the extended length and the retracted length.

12. The agricultural mower of claim 11, wherein the latch is normally positioned in a latched position to restrain the linkage in either the operating or transport positions, and wherein the latch is selectively moveable to a released position wherein the linkage is moveable between the operating position and the transport position.

13. The agricultural mower of claim 9, wherein the first end is moveable between a retracted position and an extended position while the linkage remains fixed in position.

14. The agricultural mower of claim 9, wherein the moveable end of the actuator when the linkage is in the operating position is spaced from the moveable end of the actuator when the linkage is in the transport position.

15. The agricultural mower of claim 9, wherein the first link and the second link are folded with respect to one another when the linkage is in the operating position.

16. A method for positioning an agricultural mower between a normal operating configuration and a lateral transport configuration, the method comprising:
providing a draft tongue and a moveable frame connected thereto, the draft tongue for propelling the mower in a normal operating direction wherein the frame is transverse to the normal operating direction, the frame being pivotable in relation to the draft tongue about a generally upstanding hitch pivot;
providing an actuator having generally opposing fixed and moveable ends defining a length therebetween, the length being selectively adjustable between a retracted length and an extended length, the fixed end being directly connected to the draft tongue;
providing a linkage connecting the moveable end of the actuator to the mower frame at a pivot location, the linkage allowing selective movement of the moveable end between a first position and a second position, the linkage comprising first and second link portions pivotally connected to each other;
providing a latch for restraining the linkage in either an operating position or a transport position;
positioning the linkage so that the moveable end is in the first position;
adjusting the actuator to the extended length;
restraining the frame to prevent movement relative to the draft tongue;
selecting of the linkage to allow movement of the linkage;
adjusting the actuator to the retracted length thereby moving the moveable end to the second position;
engaging the latch with the first link portion to inhibit movement of the linkage;
releasing the frame to allow movement relative to the draft tongue; and
adjusting the actuator to the extended length, movement thereof positioning the draft tongue generally perpendicular to the normal operating direction so that the mower is transportable in a lateral orientation.

17. The method of claim 16, further comprising:
providing an elongate guide link connected at one end to the moveable end and to the frame at a pivot location at an opposite end, the guide link guiding the moveable end through an arc as the actuator is adjusted between the extended length and the retracted length.

18. The method of claim 17, wherein the latch is normally positioned in a latched position to restrain the linkage in either the operating position or the transport position, the latch being selectively moveable to a released position wherein the linkage is moveable between the operating position or the transport position.

19. The method of claim 18, wherein the first and second link portions are elongate.

* * * * *